United States Patent [19]

Robertson

[11] Patent Number: 5,502,957

[45] Date of Patent: Apr. 2, 1996

[54] ELECTRIC LAWN MOWER WITH INTELLIGENT CONTROL

[76] Inventor: Charles W. Robertson, P.O. Box 154, Rockland, Del. 19732

[21] Appl. No.: 412,733

[22] Filed: Mar. 29, 1995

[51] Int. Cl.⁶ .................................................. A01D 34/68
[52] U.S. Cl. .......................... 56/11.9; 56/11.1; 56/10.2 G
[58] Field of Search ................................ 56/11.9, 10.2 G, 56/10.5, 11.1, 13.5, 10.2 R, DIG. 15

[56] References Cited

U.S. PATENT DOCUMENTS

| | | | |
|---|---|---|---|
| D. 311,742 | 10/1990 | Splittstoesser | D15/15 |
| 3,732,671 | 5/1973 | Allen et al. | 56/10.2 |
| 3,841,069 | 10/1974 | Weck | 56/10.5 |
| 5,406,778 | 4/1995 | Lamb et al. | 56/7 |

OTHER PUBLICATIONS

Kuo (Ed.) "Step Motors and Control Systems" in Incremental motion control, V2., Champaign, Ill., SRL Publishing Co, 1979, pp. 236–239.

Catalog, "BEI", Industrial Encoder Div. Motion Systems Co, BEI Electronics, Inc. Goleta, CA 93117, Optical Encoder Design Guide, rev Oct. 1984, pp. 1, 6–7.

Catalog, Hewlett Packard, "28mm Diameter Two Channel Incremental Encoder Kit", HEDS–5000 Series, Jan. 1981, pp. 1–2.

Catalog, "Dixon® Riding Mowers", Dixon Industries, Inc. Coffeyville, KS 67337, 1994, 14 pages.

*Primary Examiner*—Terry Lee Melius
*Attorney, Agent, or Firm*—Edward J. Kaliski

[57] ABSTRACT

There is disclosed an electric mower, preferably of the riding type, in which microcontrollers are interposed between quadrature controllers and motors operating each of the drive wheels. The microcontrollers are programmed to provide pulse width modulated current drive control and braking. Other functions are controlled electronically to assure operations that are not harmful to the operator, the motors, the battery or the lawn being mowed.

13 Claims, 10 Drawing Sheets

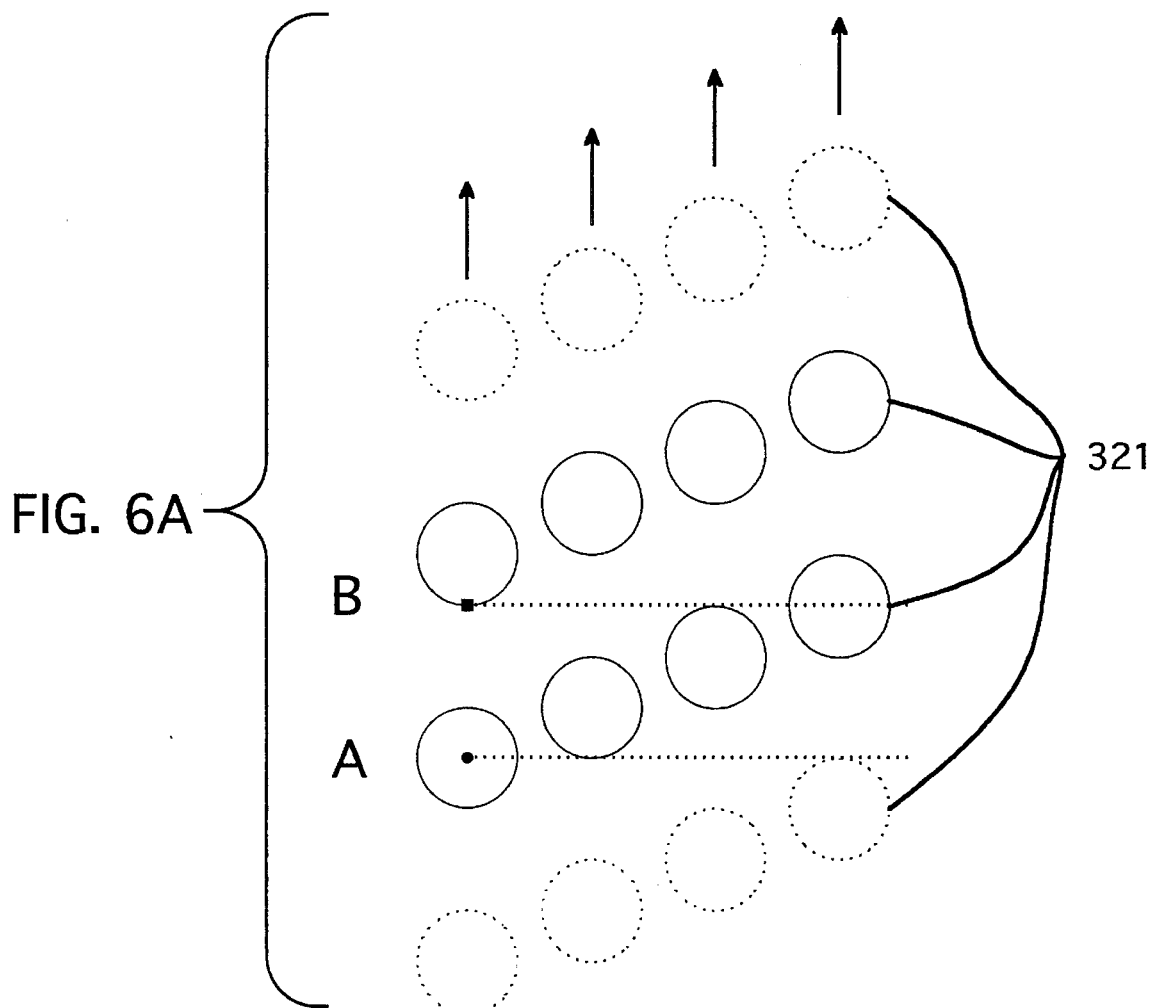
FIG. 6A
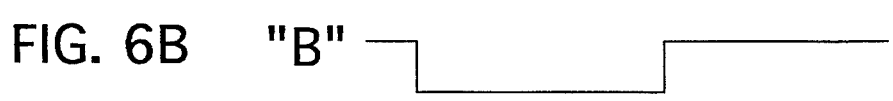
FIG. 6B "B"
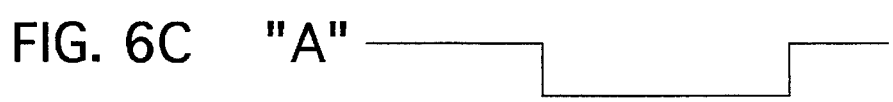
FIG. 6C "A"

| TABLE | | |
|---|---|---|
| POSITION No. | DRIVE No. X | BRAKE No. X |
| 1 | 1 | 45 |
| 2 | 1 | 45 |
| 3 | 5 | 20 |
| 4 | 5 | 10 |
| 5 | 10 | 10 |
| 6 | 10 | 2 |
| 7 | 15 | 2 |
| 8 | 15 | 2 |
| 9 | 20 | 2 |
| 10 | 25 | 2 |
| 11 | 25 | 2 |
| 12 | 30 | 2 |
| 13 | 30 | 2 |
| 14 | 35 | 2 |
| 15 | 35 | 2 |
| 16 | 40 | ... |
| 17 | 40 | ... |
| 18 | 45 | ... |
| 19 | 45 | ... |
| 20 | 50 | ... |
| 21 | 50 | ... |
| 22 | 54 | ... |
| 23 | 54 | ... |
| 24 | 54 | ... |
| 25 | 54 | ... |
| 26 | 54 | ... |
| 27 | 54 | ... |
| 28 | 54 | ... |
| 29 | 54 | ... |
| 30 | 54 | ... |
| 31 | 54 | ... |
| 32 | 54 | ... |

FIG. 9.

ELECTRIC LAWN MOWER WITH INTELLIGENT CONTROL

FIELD OF THE INVENTION

This invention relates to the field of self-propelled electric vehicles, particularly to relatively small electric vehicles and even more particularly to self-propelled, riding electric lawn mowers.

BACKGROUND OF THE INVENTION

Electric lawn mowers are desirable for environmental reasons in that they greatly reduce, if not entirely eliminate, the noise pollution and the atmospheric pollution inherent in the more commonly used mowers driven by small internal combustion engines. However, it is more common to find electrical drives in walk-behind mowers that are tethered to an electrical outlet by a power cord than it is to find them in larger and heavier riding mowers.

Self-propelled electric mowers and especially self-propelled riding electric mowers, are not common. This is largely due to higher cost and lower efficiencies of the electrical motors previously available, and the high cost, relative inefficiency and low reliability of electrical controls previously available. Recently when efficient large permanent magnet motors and low cost, reliable electronic power control devices became commercially available such machines became feasible. The art, therefor has not provided the other advantages that on-board electrical power provides. These include control by flexible wire, or optical fiber, of remote functions such as drives permitting articulation without complicated connections and control by programmed controllers interposed between the operator and the functioning parts to provide optimal, smooth operation and safety for both the operator and the lawn being mowed.

It is an object of the instant invention to provide intelligent control of an electric mower, or any related small, self-propelled, wheeled-device, particularly self-propelled riding electric mowers, and to provide control by wire of the driving wheels thereof and a contour-following mower deck.

STATEMENT OF INVENTION

The invention is an electric lawn mower comprising:

a frame supporting at least two opposed wheels driven by individual associated reversible electric motors through gear reduction boxes or the like, a source of electrical power for said motors, operating controls for directing electrical power selectively to each of said motors for mower-operator actuation, an electrical system interconnecting said source of power, said operator controls and said motors, the mower preferably having at least one swiveling tail wheel and an articulated sub-frame from which a ground following mower deck is suspended to carry at least one motor driven cutter blade; the improvement comprising:

an intelligent control system programmed to avoid conditions harmful to said electrical system and its components and to avoid conditions harmful to safe operation of said mower or harmful to its operator or damaging to the lawn being cut, and to optimize in real time mower operation;

said control system interposed electrically between said operating controls and said motors:

said control system further receiving informational input from said operating controls indicating both existing status and any actuation indicating operator's control directives;

said control system still further receiving input from said motors indicating the current status thereof in terms of one or more of the conditions of speed, direction of turning, back EMF, drive current, temperature and load.

The invention provides an intelligent control system for controlling the speed of an electrically powered lawn maintenance vehicle or the like, the vehicle having a known weight and comprising: a source of electrical power; a drive subsystem comprising at least one motor drive unit and at least one electric motor for propulsion, a motor speed and direction sensor, and at least one temperature sensor; a power distribution subsystem; and an operator control unit; the control system comprising: a microcontroller, programmed to sense motor speed and direction, operator commands from the operator control unit, and temperature of the drive subsystem components, and to generate pulse width modulated speed control signals; whereby the microcoontroller, being programmed with tables of speed control values for generating corresponding pulse width speed control signals, and the motor drive unit being capable of supplying current to the at least one motor in accordance with the speed control signals, and the operator control unit, having a control handle operatively connected to a handle position sensor, the position sensor having a home position to indicate a desired STOP condition and at least two forward and two reverse speed positions, being capable of generating operator commands, the liable of speed control values being selected in accordance with the dynamic operating characteristic of the electric motor and the weight of the vehicle, whereby safe and effective operation of said vehicle is achieved, conditions harmful to the drive subsystem are avoided, and forces harmful to the lawn and to the operator are avoided.

BRIEF DESCRIPTION OF THE DRAWINGS

FIG. 6A is a schematic functional diagram showing the operation of the quadrature encoder used with the invention.

FIGS. 6B and 6C are timing graphs associated with the functional diagram of FIG. 6 showing the response of optointerupters "B" and "A" respectively as labeled.

FIG. 9 is a table of the PWM values used to control the drive motors.

DESCRIPTION OF THE INVENTION

Figure 1:
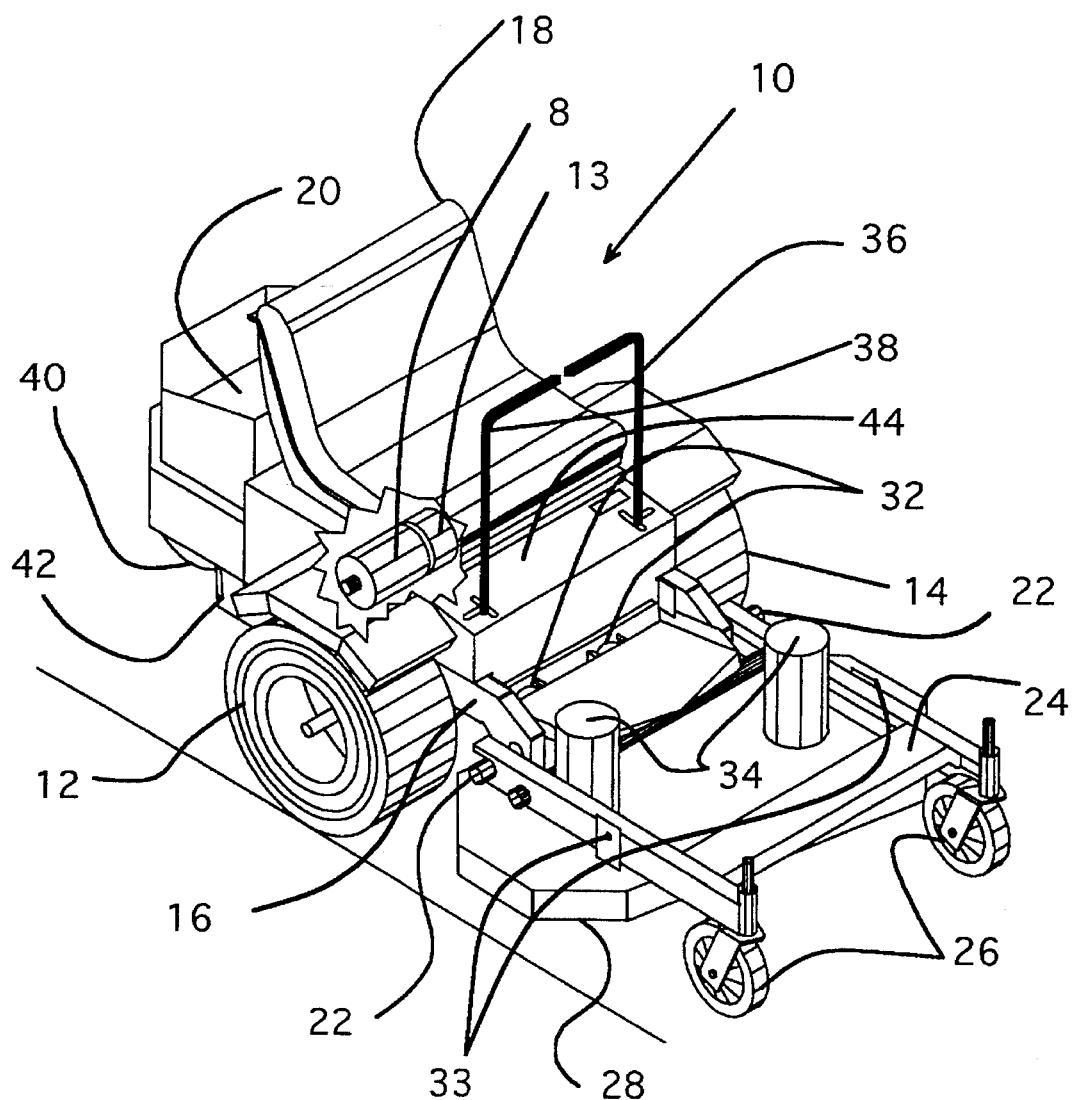
FIG. 1 is a perspective drawing of the mower of the invention.

The mower 10 of the invention is shown in FIG. 1. Visible are the drive wheels 12, 14 which propel and support the main frame 16 of mower 10. These are driven by motors 8, 8', one of which is seen in the figure, which drive through a gear reduction boxes not shown. The drive motors 8, 8' are electronically controlled, as will be seen, from signals generated in electronic enclosure 44 by controllers 11, 11' (see FIG. 3 where one such, 11, is shown) and transmitted to motor drive boards 13, 13' which are mounted in housings either next to or near the motors 8, 8'. Mounted on frame 16 is seat 18 and carry container 20 behind seat 18. Pivoted to frame 16 at its forward end by pivot pins 22 is articulating frame 24 which is supported at the end away from the main frame 16 by swivel wheels 26. Note that a single, centrally located, swivel wheel might be used but the two wheel arrangement shown is preferred for stability. Mower deck 28 is pivotally supported, by hanging brackets 33, from the forward end of articulating frame 24. The rearward end of deck 28 is supported from the ground by wheels 32. One centrally placed wheel can be used. Mower blade drive motors 34 are fastened to the top of deck 28. Conveniently placed for handling by an operator sitting on seat 18 are left wheel control stick 36 and fight wheel control stick 38. As will be seen later, control sticks 36, 38 pivot forward and backward to regulate direction of rotation and speed of the respective drive wheels 12, 14 and, as is known, any difference in speed and or direction of rotation determines the degree and direction of turning. Control sticks 36, 38 also can be pivoted, when in the central (stop) position, outward to provide room for the operator to get into or out of the seat 18. The necessary storage batteries are located under seat 18 within enclosure 42. A trailing pivot wheel 40 supports the back end of mower 10.

Figure 2A:
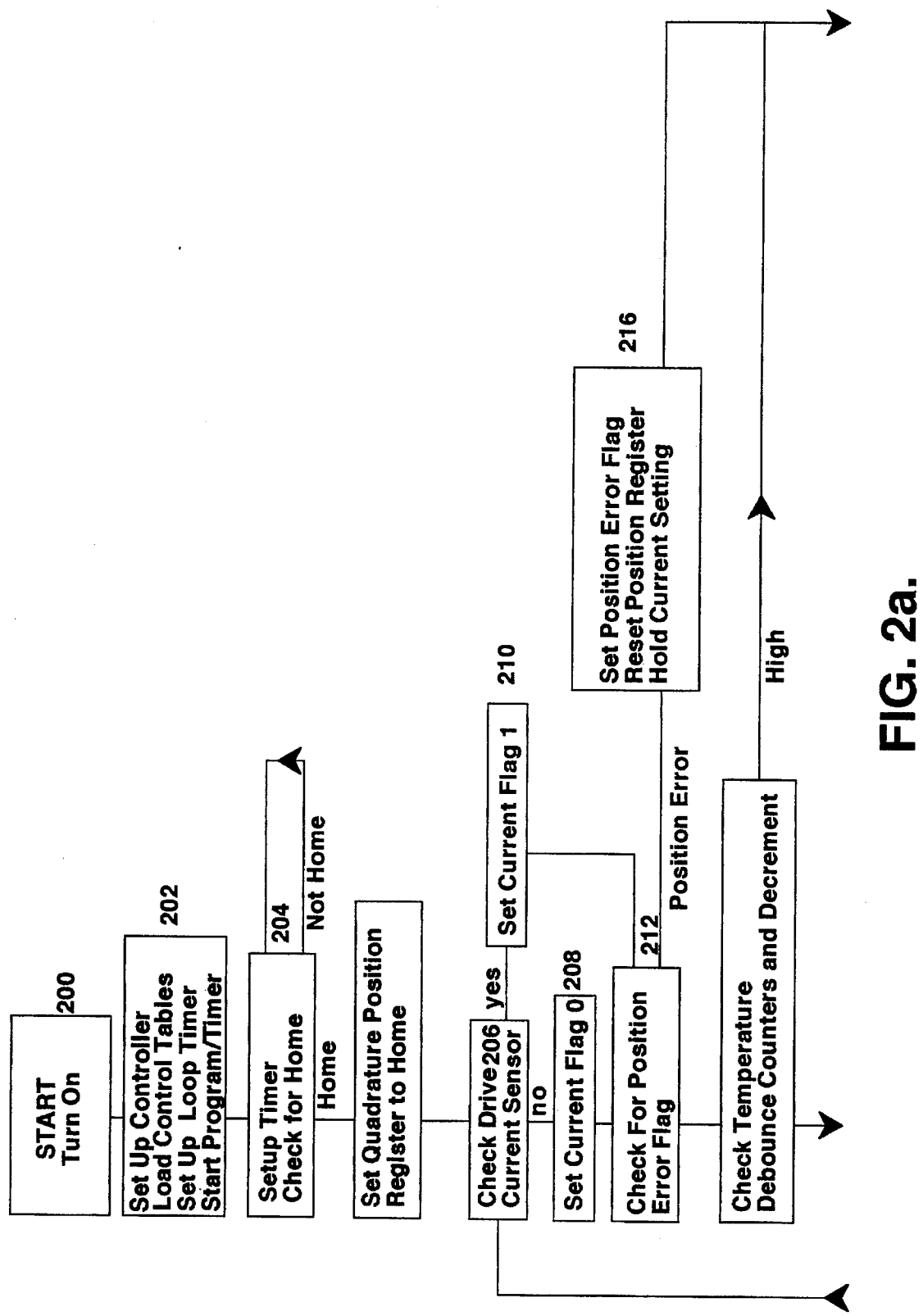
FIGS. 2a and 2b serve together as a mower control program flow chart.
Figure 2B:
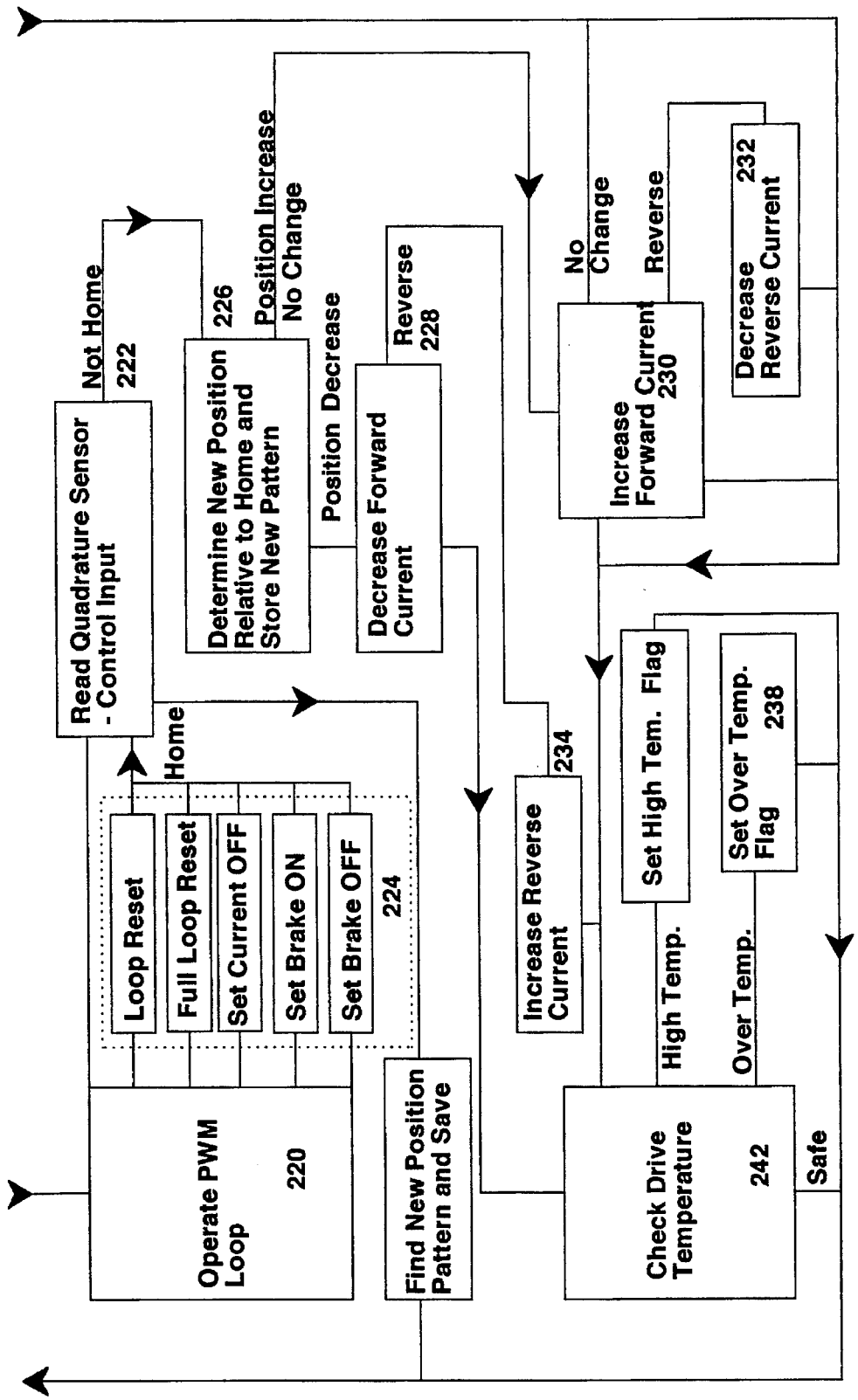

Now consider FIGS. 2, 2a which show a flow chart of the program employed by controllers 11, 11' to control the drive motors 8, 8' according to the operator's control inputs to control arms 36, 38. The full program listing of the controller program is given in Appendix A.

Figure 4:
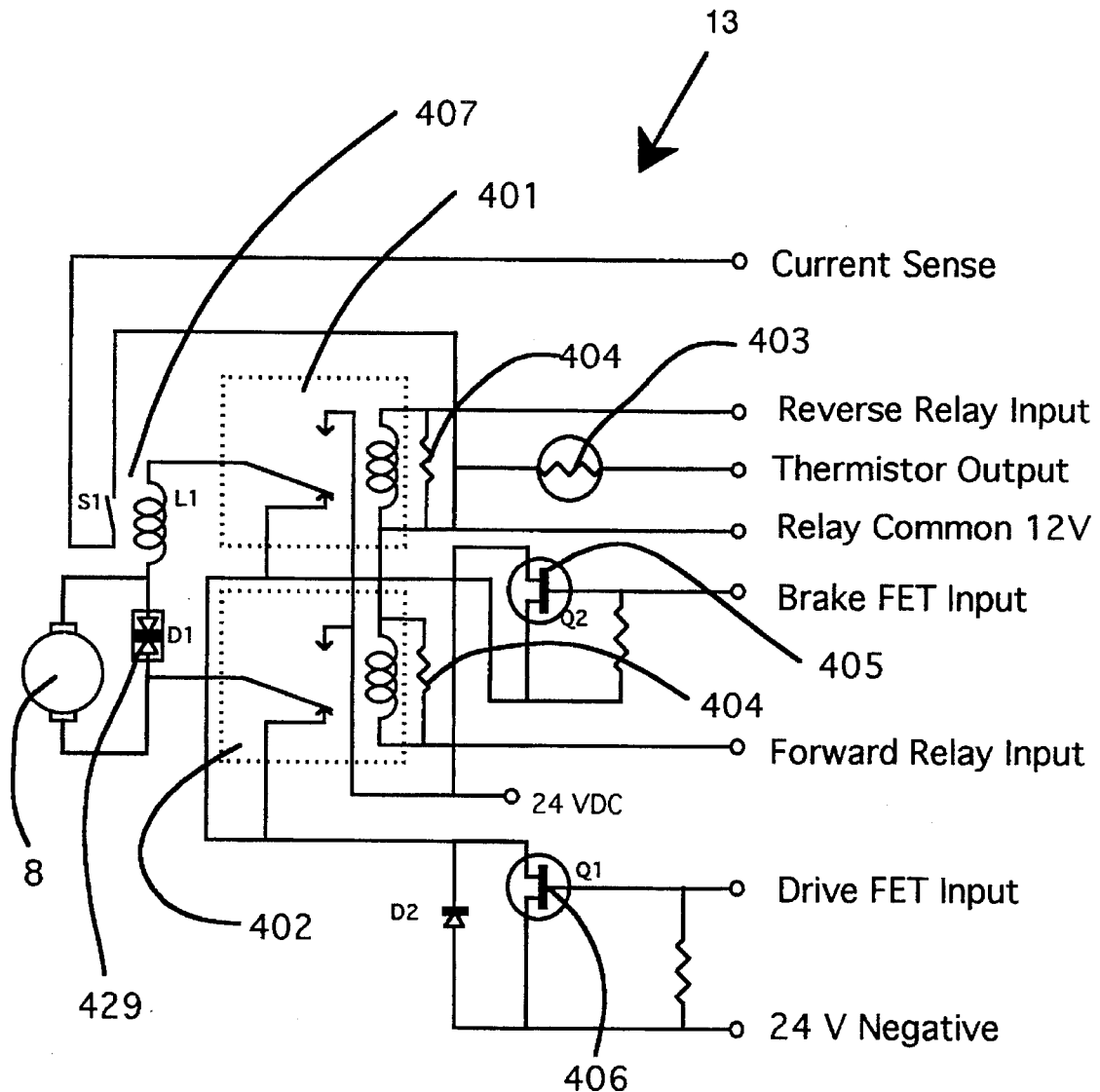
FIG. 4 is a schematic of the overall mower.

Functionally, the control arms 36, 38 must be in the central or home position for the program to begin execution. This is shown in the flow chart of FIG. 2a at 204. If the control arms are not in the home position, the program waits until they are. Once home position is detected, the controller checks for current in the motor drive board 13, 13' by reading the current sensor 407 (FIG. 4). Relays 401, 402 short circuit (disable) the drive motor when the control arms are in the home position. If current is flowing, the drive motor is turning indicating mower motion and the current flag 1 is set, 210. At startup, current will not be applied to the drive motors until no short circuit current is detected in the drive motors, indicating the mower is stopped. It is well known in the art that applying current to a permanent magnet DC motor in the direction of the motor generated back EMF can generate sufficiently high armature magnetic fields to permanently damage the motor magnets and sufficiently high currents to damage drive electrical components and this condition is avoided. When no short circuit current is detected, the current flag is set to 0. As long as the control arms are in the home position, the position register controlling the setting of the drive motor current will be set to home position value 205. Each loop checking the control arm position will check for errors in the reading of position and set a position error flag if an error has been made in position determination.

As the operator moves the control arm from the home position to operate the machine, the control loop beginning in 206 determines the fraction of time the current will be turned on in the drive motor associated with that control arm position by looking up the drive number in the lookup table shown in FIG. 9. This drive number indicates how many of the 54 loops in each current control cycle the current should be on. This control strategy, called pulse width modulation (PWM) turns the drive motor current on for integral numbers of the 54 loops in the PWM control cycle. Similarly the number of loops the motor will be electrically shorted when not turned on will be derived from the control arm position value for braking in the same table. The first few position values for the control arm are mostly for braking to facilitate operation down steep slopes. This permits steering when descending a steep hill when no driving force is needed. The next few positions have both drive and braking times so the drive motors behave in a damped fashion permitting slow controlled motion on smooth surfaces or speed control and steering down modest soft surfaced slopes. The remainder of the position values cause increasing current-on times for the drive motor current, full on coming toward the end of travel of the control arm. The same control strategy holds for forward and reverse.

Now return to FIGS. 2a and 2b. Which represent schematically the functions of the program residing in the microcontrollers 11 (a preferred computer program is seen in Appendix A0. At powerup, the tables residing in the ROM memory space of microcontrollers 11, 11' for controlling the current and brake pulse width modulation (PWM) timing are loaded into the microcontroller register section 202. An example of one such table is shown in FIG. 9. Each PWM cycle is composed of 54 loops. The number of loops for which drive current and braking are to be applied to the motor are specified as described above for each position of the 32 positions into which the control motion is divided (32 positions for forward and 32 steps for reverse drive). In some implementations the reverse drive is made more coarse by double stepping through the table. Since no more than 16 of the steps employ braking, this part of the table is shorter. The control routine will use the stored values for both drive current and/or braking from the position in each of the tables corresponding to the position of the control handle. Note that the values for current are not linear in response to movement of the quadrature (that is there is not a direct proportional relationship between step number and current value in the table) but are tailored to practical operating requirements. Current increases rapidly at first to overcome motor losses at low speed, and then increases less rapidly at higher drive levels.

Once the tables are loaded, the timer is set up to control the overall routine loop timing and control function begins. First the status of the control handle is checked 204. Power will not be applied to either drive until its control handle is in the home position. The current sensor on the motor power control board is checked 206, and power will not be applied until the drive short circuit current is below detection threshold, i.e. the machine is not moving at speed above the sense threshold. Once power control has started, if current is detected, a bit (current flag) is set from 0 to 1 in the flag register 210. This flag will be used by other control sections to prevent the drive from applying forward or reverse drive current if the machine is moving in reverse or forward respectively. Thus the machine must be moving at a speed below the current-sense threshold for the control to shift from forward to reverse or vice versa.

Next the control routine checks the position error flag 208 to determilne if the quadrature plate position has been lost 212. If the position has been lost, it will be reestablished 216, the flag reset, and the level of drive current held at the value in effect at the time of last valid position until home is reached on the control handle.

Next the temperature debounce counters are checked 214. If a high or over temperature condition is detected, four counts are added to the appropriate register. Each time the registers are checked, they are decremented one (but are never decremented below zero or incremented above 255) and they must indicate a count of 128 or more for the high or over temperature condition to be valid. This serves to "debounce" the process and minimize the possibility of a "temperature" response to electrical noise.

Next the PWM loop is checked 220 and appropriate counters are incremented or decremented to control the level of drive current to the motors. Exit from this loop is via one of several paths 224, all leading to the reading of the quadrature plate, position 222.

Exit from the quadrature plate routine is either a home or not home response. If the control is home, the pattern of the quadrature plate will be updated, and the overall loop returned to its beginning 240. If the control is not in its home position, exit will take the control routine to the section where it is determined if a change has taken place in the quadrature plate position or not 226. If no change has been made, control will transfer to the temperature checking routine. If a change has been made, the appropriate decisions for whether to increase or decrease the current in either the forward or reverse directions will be made 228 and control will transfer to the temperature checking routine 242.

The last section of the control routine checks to see if the temperature of the drive motors or the drive electronics is high or over temperature 242 and multiply increments the appropriate register and sets the appropriate flag if the counters are above their threshold level. The routine also shuts down the drive if the temperature is over the acceptable limit. From here the routine returns to its start.

Figure 3:
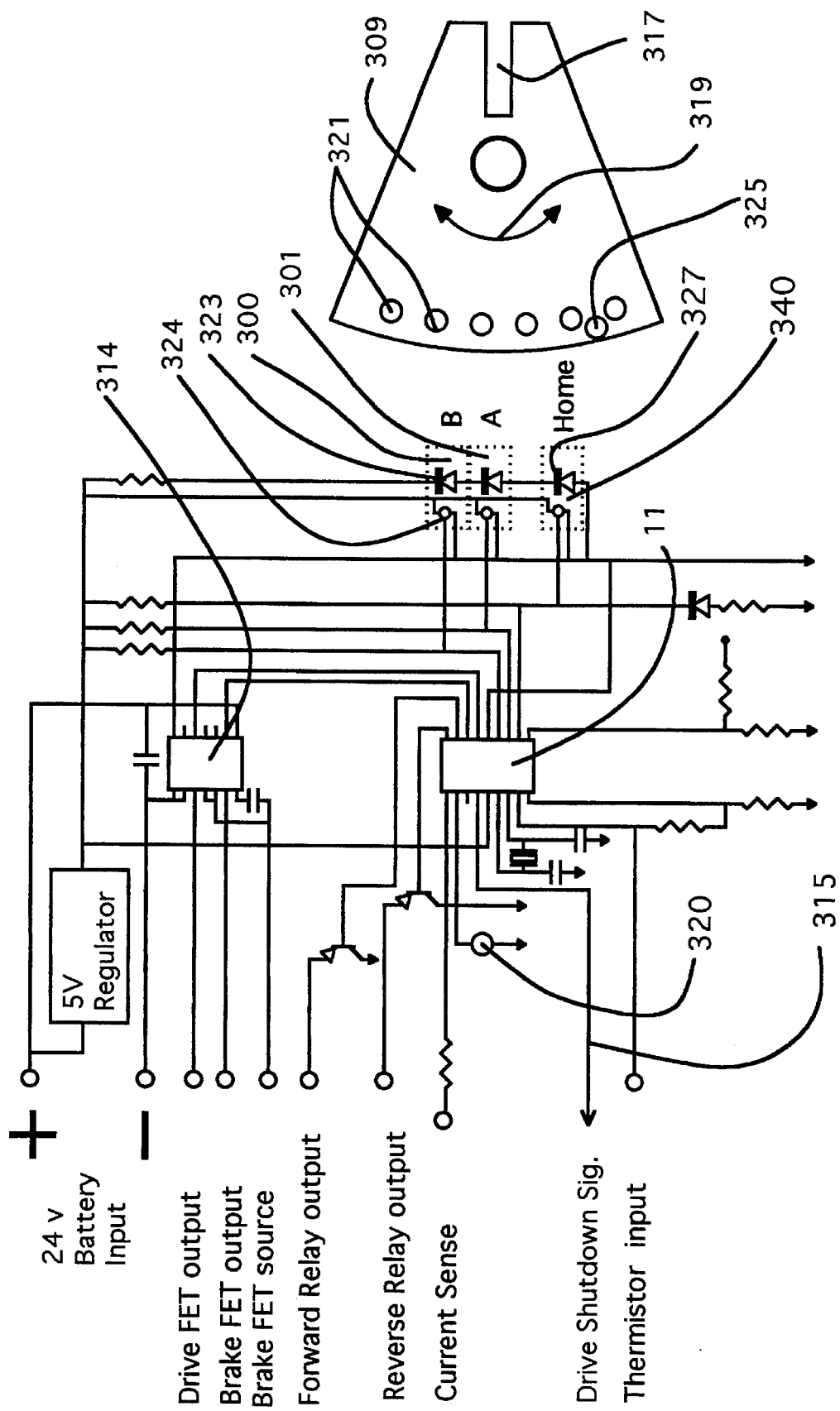
FIG. 3 is an electrical diagram showing the controller used with the invention.

Now consider FIG. 3 which shows one of the two drive motor controllers. A control stick 36 or 38 engages with slot 317 in the end of a quadrature plate 309 there being one plate 309 and associated elements in the control for each drive motor and wheel. One of skill in the art will recognize that a single joy stick or even a steering wheel could be substituted with appropriate circuitry in place of the preferred two control sticks 36, 38. For illustrative purposes the drive will be described for left wheel drive control stick 36. Forward and backward motion of the stick causes quadrature plate 309 to rotate about its axis as indicated by the curved double arrow 319. Holes 321 along the edge of plate 309 alternately interrupt or pass light from the light emitting diode (LED) 323 of the optointerrupter 300 (p/n OTS271 made by Opto Technology, Inc. of Wheeling, Ill.), designated B, whose signal from photo IC sensor 324, also a part of optointerrupter 300, is accessed by a microcontroller 11. Similarly the signals from optointerrupter 301, designated A, whose signals are out of phase with those of 300 are accessed by microcontroller 11. We use a model Z86 microcontroller from the Zilog Corporation of Campbell, Calif. This permits microcontroller 11 to determine the extent of motion of control stick 36 as is explained below. One hole 325, placed out of line from the others, can only pass the light from LED 327 of optointerpreter 340, designated home, and serves as a reference point in the rotation of quadrature plate 309 and, therefor, as a reference point in the position of control stick 36.

Reference should be made to FIG. 6 for an explanation of the quadrature encoder. Such systems give signals indicating direction and magnitude of motion. A more complete explanation of quadrature controllers can be found on pages 238 and 239 of *Incremental Motion Control*. Volume II. *Step Motors and Control Systems*, Edited by Benjamin C. Kuo, SRL Publishing Company, Champaign, Ill., 1979; *Optical: Encoder Design Guide*, pages 6 and 7 from the Industrial Encoder Division of BEI electronics; or 28 mm Diameter Two Channel Incremental Optical Encoder Kit data sheet from Hewlett Packard, page 2.

Microcontrollers 11, 11' also accept signals from the motor driver boards 13, 13' (see FIG. 4) from the current sensors 407 and from thermistors 403 which are mounted in the drive motors 8, 8'. The thermistor 403 in motor 8, when indicting the motor temperature is too high, will cause microcontroller 11 to disable the drive for drive motor 8 and communicate through line 315 to the microcontroller 11', not shown, to also shut down the drive control to drive motor 8' so that mower drive operation ceases completely and safely. Similarly, an over-temperature condition in motor 8' will cause that drive to be shut down and communication through line 315 will cause the drive for motor 8 to be shut down. The current sensor 407, see FIG. 4, is comprised of a magnetically sensitive reed switch coaxially mounted in a coil of wire, carrying the motor drive and short circuit current. This lets microcontroller 11 know if sufficient current is flowing in the short circuited motor to cause drive motor, or drive motor controller damage or loss of machine control if control direction were reversed with the machine moving. Thus a reversal in the drive at speeds capable of damaging the drive motor or its controller or causing loss of control is avoided. Moreover, sharp reversals of drive wheels 12 can damage the turf and/or pitch the operators out of seat 18 and these dangers, too, are avoided.

Now consider FIG. 4 showing the schematic of the motor driver board 13. Power to the drive motor 8 is controlled by alternately switching on and off, pulse width modulating, the drive FET (p/n IRFP044 from International Rectifier of El Segundo, Calif.) 406 with the ratio of the on and off times dictating the fraction of full drive needed. The drive relays 401 and 402 (p/n VF4-15F13 from Potter and Bruinfield of Princeton, Ind.) control the direction of the current to the motor 8 thus controlling drive direction and, when both are either on or off, the motor is shorted providing strong dynamic braking. Transient suppressor (p/n 1.5KE33C from Fagor Electronic Components, Inc. of Elk Grove Village, Ill.) 429 on motor driver board 13 provides a short to the inductive flyback transient from motor 8 when it is switched off by drive FET 406. Resistors 404 provide flyback suppression for the drive relays 401 and 402. FETs 405 and 406 are driven from the microcontroller 11 through the driver 314, see FIG. 3, which is a MIC5022BN from the MICREL Corporation of San Jose, Calif. Brake FET 405 (also an IRFP044) is controlled to provide dynamic braking to the mower by shorting motor 8 for variable fractions of the pulse width modulation (PWM) cycle when drive FET 406 is off. The driver 314 prevents both FETs, 405 and 406, from being turned on at the same time.

Figure 5:
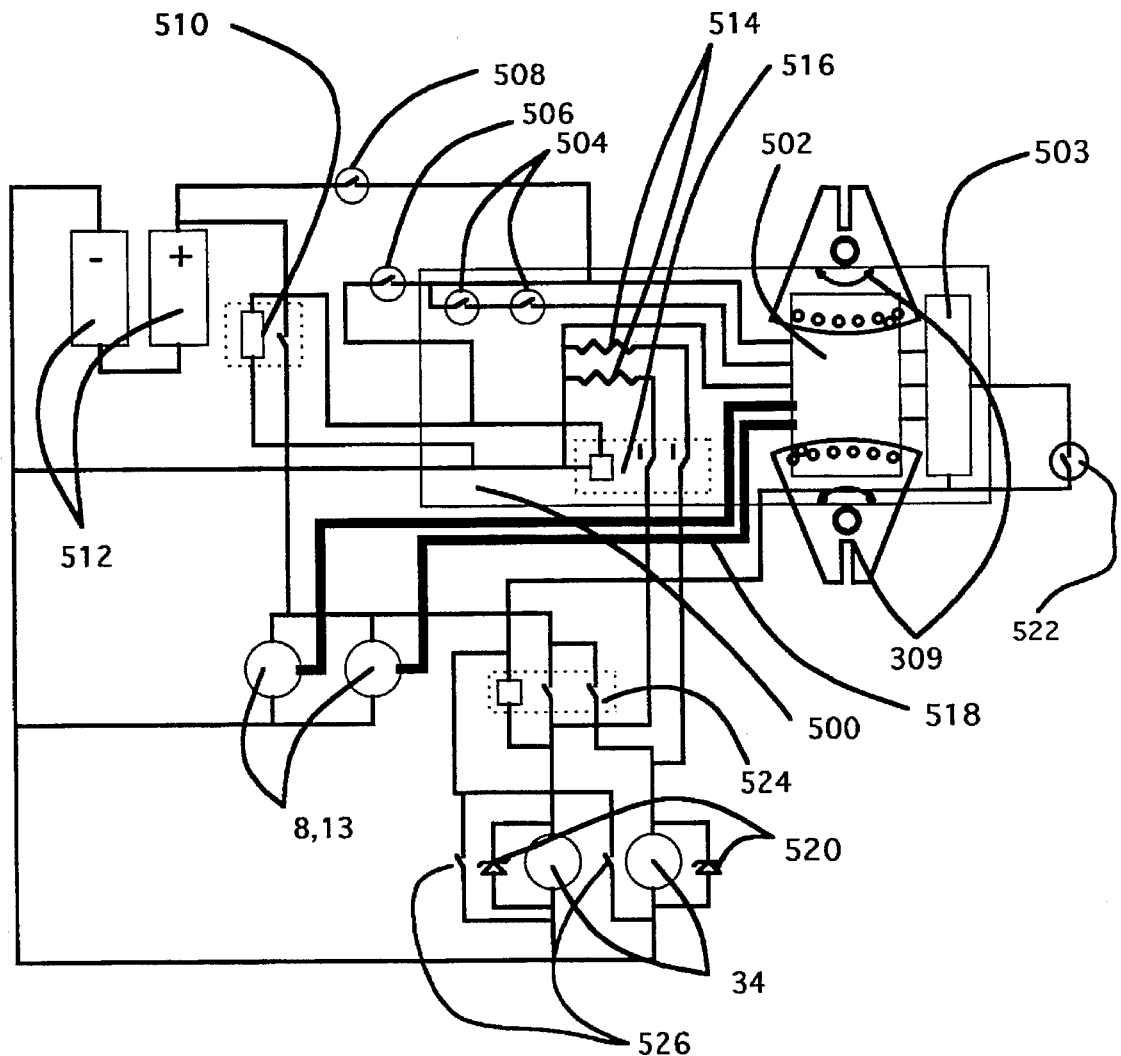
FIG. 5 is an electrical diagram showing the motor driver of the invention.

Now consider FIG. 5 showing the interconnection of all of the electrical components on the mower. Power from the batteries 512 is connected to the main control circuit board 500 through key switch 508. Power to the drive motors 8, 8' and the mowing deck motors 34 passes through power contactor 510. Control power to this contactor is additionally controlled through seat interlock switch 506. Power to the drive control electronics 502, shown in FIG. 3, is interlocked through switches 504 which detect the position of control arms 36 and 38 and disable the drive when the control arms are moved out to let the operator on or off the machine. Energy monitor 503 shown schematically in FIG. 7 and deck motor kill switch 522 can either shut the deck motors 34 down through the auxiliary coil on circuit breaker 524 (BB2-X0-03-180-231-C from Carlingswitch of Plainville, Conn.). Quadrature plates 309 also mount to this circuit board. Relay 516 shorts the deck motors 34 through power resistors 514 when the deck is shut down to stop them more quickly for safer operation. Suppression diodes 520 short the inductive flyback transients on deck motors 34 when they are shut down. Thermostats 526 provide over temperature shutdown for deck motors 34, shutting down power by acting through the auxiliary shutdown coil of circuit breaker 524. Control signals are carried from the control electronics to the motor drivers 13, 13' attached to the motors 8, 8' by means of cables 518.

Now consider FIGS. 6A, 6B and 6C. As the two optointerrupters A and B (see 300 and 301 of FIG. 3) are subjected to the motion of holes 321 in the quadrature plate 309 showing motion here from bottom to top the signals shown in the lower portion of the figure are generated. By optointerrupter is meant the pairing of a LED light emitter and a photo IC light sensor as is shown in FIG. 3 as 300, 301, and 340. It can be seen that motion of one pitch (one hole and one space) produces four transitions on the two optointerrupters. Direction of motion can be determined by noting the state of B as A transitions from high to low. For motion from left to right, B is low when A transitions from high to low. For motion from right to left, B is high when A transitions from high to low. Distance can be determined from the sum of A and B transitions (there are two transitions on each for each passing hole) which is in essence a count of the pitches multiplied by 4.

Figure 7:
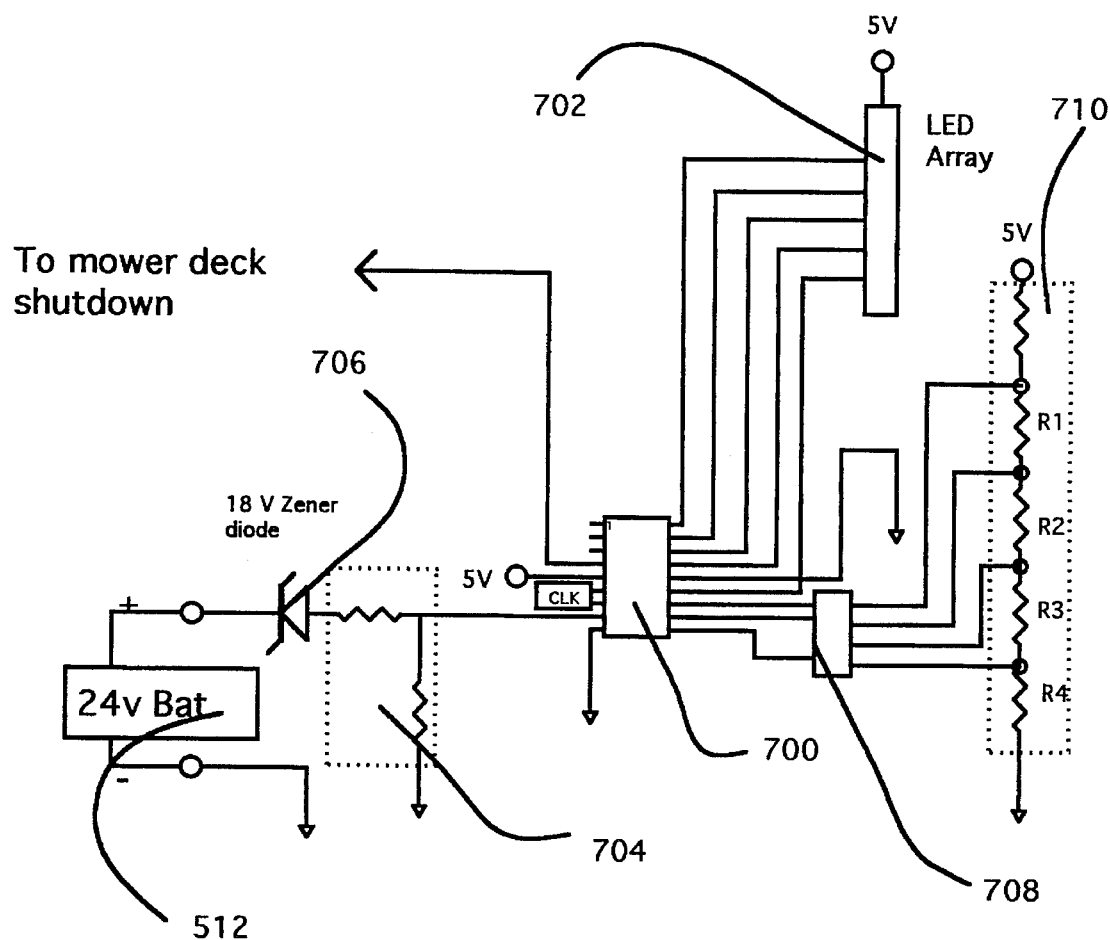
FIG. 7 is an energy monitor schematic.
Figure 8:
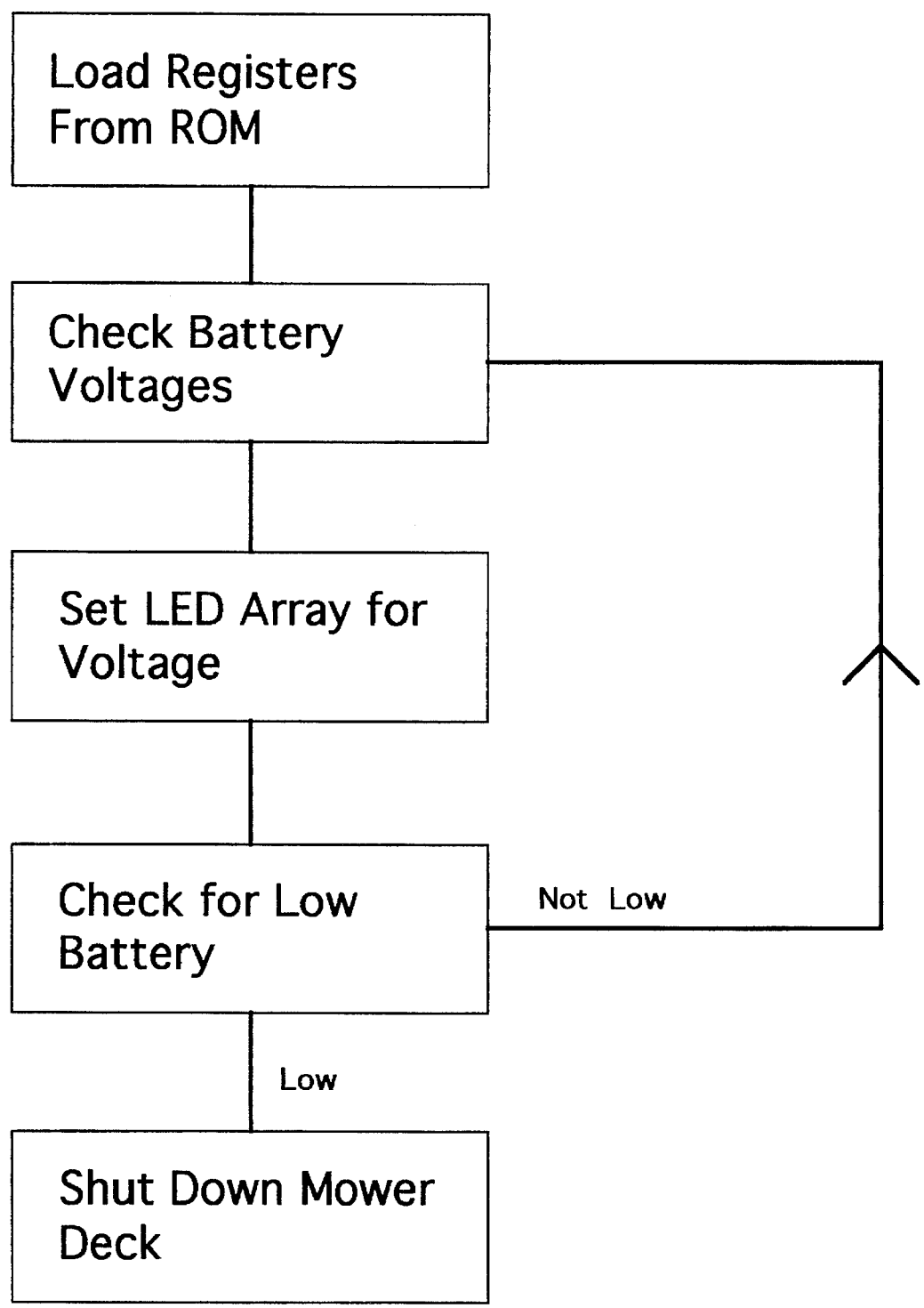
FIG. 8 is a flow chart of the microcontroller in the energy monitor.

The energy monitor is shown schematically in FIG. 7. This system keeps track of battery voltage when the mower is running, displaying the current battery voltage on an LED array, 702. When the voltage drops below 21.0 volts, the 80% discharge point for a 24 VDC lead-acid battery system, the microcontroller, 700, a Zilog Z86, shuts down the mower deck, preserving the remaining power to permit the machine to be driven back to its point of storage. Battery voltage is measured by comparing the voltage of the system battery, 512, with the voltages of a resistor divider chain, 710. The divider chain provides 4 voltages between 0 and 5 VDC which are compared by means of the comparitor internal to the Z86 (microcontroller 700), the voltages being accessed by multiplexer 708 (CD4052BCM-ND made by National Semiconductor) to a voltage derived from the battery voltage. The system battery voltage is dropped through an 18 V Zener diode, 706, and divided by resistor divider 704. The comparison of the voltage from the divider 704 and the voltages from divider 710 gives 4 comparisons that approximately divide the stored energy in the mower batteries into four quarters much like a fuel gauge (i.e. full, ¾, ½, and ¼ full). The bottom voltage, 21 VDC, represents the mower deck shutdown voltage. Approximately 80 percent of the full energy storage of the mower batteries has been used when the system voltage reaches 21 volts. A flow chart for the operation of this controller is shown in FIG. 8.

Now consider FIG. 9, a table of control values for the drive motor current and braking. Each of the control arms 36 and 38 have 32 positions for forward drive and 32 positions for reverse drive. The pulse width modulation of the drive and braking has 54 possible values (e.g. the drive current or braking can be on for $10/54$ of the time or $54/54$=all of the time). For each position in the table a value for both the drive and braking is specified. For instance, for position 5, the motor is on for $10/54$ of the time and the braking is on for $10/54$ of the time (drive and braking cannot be on at the same time!). The remainder of the time the drive motor is not connected during drive operation (with the controls disabled or in the home or center position the motor is shorted by relays 401 and 402). Braking is not used for higher drive currents as it reduces the effective power of the drive motors. Thus the table has only 15 values for braking. Braking is only needed at lower speeds to damp the drive motors action since when they are not connected they provide neither drive force nor braking action. The non sequential (non linear) nature of the drive current numbers that provides the smoothness of operation was determined from testing. Turning the motors on for less than $5/54$ of the time has little effect and the full resolution of the 32 possible positions was found unnecessary. As can be seen from the table, the motors are turned on $54/54$ of the time, or full on, for positions 22 through 32.

While this disclosure has been written, largely in terms of lawn mowers, it will be recognized that the invention is applicable to related vehicles such as golf carts, carriers for the handicapped, garden vehicles and the like.

Appendix A

```
;  7-09-94      version 1.2
;
;       Description:
;
;       This program reads the mower drive quadrature cam and
;       controls the drive motor via PWM drive of the control FET.
;
;       PINOUT
;
;P2 = mixed input and output, active Pullup
;
;       I/O     P2.7    shut down - input/output
;       I/O     P2.6    current limit - input/output
;       O       P2.5    "beeper" drive
;       I       P2.4    drive motor current indicator
;
```

```
    ;    O    P2.3   reverse relay control
    ;    O    P2.2   forward relay control
    ;    O    P2.1   MICREL driver input - high=brake FET
    ;    O    P2.0   MICREL driver enable - PWM drive here
    ;
    ; P0 = quadrature cam inputs
    ;
    ;    I    P0.2   quadrature A sensor
    ;    I    P0.1   quadrature B sensor
    ;    I    P0.0   neutral sensor
    ;
    ; P3 = analog comparitor inputs - drive motor temperature
    ;
    ;    I    P3.1   high temp - current limit
    ;    I    P3.2   over temp - shut down
    ;    I    P3.3   comparitor reference (Vcc)
    ;
        .SECTION DATA
    ;
    ; register file %60 - %6F
    ;
    drive1_regs    .EQU   60H
    ;
    ;Registers
    ; R0 current quadrature position -- 128 = neutral
    ; R1 quadrature position pattern - shifted to match (LSB=A&B)
    ; R2 quadrature position - just read
    ; R3 quadrature position test register - pattern manipulation
    ; R4 Temperature high test
    ; R5 temperature over test
    ; R6 beeper on duration
    ; R7 beeper spacing duration
    ; R8 current limit level - quad cam distance from home (0-32)
    ; R9 image of P2
```

21

```
    ; RA PWM loop - total cycle count (32 orignially)
    ; RB PWM timing - current on count# - pointer to PWM count table
    ; RC PWM on counter
    ; RD Brake count - on/brake delay
 5  ; RE    Brake counter for PWM braking at low drive levels
    ; RF Flags Register -MSB-Forward,Reverse,Home,Beeper,HiTemp,
    ;                   OvrTemp,PosEr,Current-LSB
    ;
     PWMcur_regs        .EQU 40H;    PWM current on time values
10  ;
    PWMbrake_regs      .EQU 30H;    PWM times for braking - shorting drive motor
    ;
    PWMcur_resolution .EQU 36H;    # of cycles to complete the PWM loop
    ;
15  Quad_position     .EQU drive1_regs+0;   128 +/- 32
    rQuad_position    .DEF R0;
    ;
    Quad_pos_ptrn     .EQU drive1_regs+1;   2 bits = A&B - middle bits low byte
    rQuad_pos_ptrn    .DEF R1;
20  ;
    Quad_pos_ptrnu    .EQU drive1_regs+2;   most recent A&B
    rQuad_pos_ptrnu   .DEF R2;
    ;
    Quad_pos_tstreg   .EQU drive1_regs+3;   A&B manipulation and test
25  rQuad_pos_tstreg  .DEF R3;              sort of accumulator
    Tstreg            .DEF R3;
    ;
    Temphi_count      .EQU drive1_regs+4;   HiTemp debounce register
    rTemphi_count     .DEF R4;
30  ;
    Tempovr_count     .EQU drive1_regs+5;   OverTemp debounce register
    rTempovr_count    .DEF R5;
    ;
    Beepon_dur        .EQU drive1_regs+6;   "on" portion of beeper pattern
```

22

```
        rBeepon_dur     .DEF R6;
        ;
        Beepspc_dur     .EQU drive1_regs+7;    "beep" spacing
        rBeepspc_dur    .DEF R7;
 5      ;
        PWMcur_limit    .EQU drive1_regs+8;    quad cam distance from 128
        rPWMcur_limit   .DEF R8;               absolute value -- sets current
        ;
        P2_image        .EQU drive1_regs+9;    image of port P2
10      rP2_image       .DEF R9;
        ;
        PWM_count_cycle .EQU drive1_regs+10;   # of possible PWM on times
        rPWM_count_cycle .DEF R10;
        ;
15      PWM_count_cur   .EQU drive1_regs+11;   pointer for PWM current
        rPWM_count_cur  .DEF R11;              table value
        ;
        PWM_on_counter  .EQU drive1_regs+12;   # of PWM count cycles that
        rPWM_on_counter .DEF R12;              current is on
20      ;
        Brake_count     .EQU drive1_regs+13;   This register is used to store
        rBrake_count    .DEF R13;              the count to delay drive-brake
        ;                                      shift
        ;
25      Brake_counter   .EQU drive1_regs+14;   Unassigned register
        rBrake_counter  .DEF R14;
        ;
        Flags           .EQU drive1_regs+15;   System status flags
        rFlags          .DEF R15;
30      ;
        ;
        ;   constants

STACK           .EQU  %20;
```

```
        wdt      .EQU  %5f;
        ;
        QuadPos .EQU%3C;                      0011 1100 the four patterns for
        ;                                     A & B in bits LSB+1/+2
 5
        .SECTION CODE .ORG   0000H
        IRQ0:  .WORD  00H
10      IRQ1:  .WORD  0H
        IRQ2:  .WORD  0H
        IRQ3:  .WORD  0H
        TIMER0: .WORD  hfmsec_service
        ;
15      .ORG   0CH
        ;
        start:
        jp     init_sys
        .ASCII 'Drive.1'
20      ;
        PWMcur_values:
        .byte 1;
        .byte 1;
        .byte 5;
25      .byte 5;
        .byte 10;
        .byte 10;
        .byte 15;
        .byte 15;
30      .byte 20;
        .byte 25;
        .byte 25;
        .byte 30;
        .byte 30;
```

```
        .byte 35;
        .byte 35;
        .byte 40;
        .byte 40;
 5      .byte 45;
        .byte 45;
        .byte 50;
        .byte 50;
        .byte 54;
10      .byte 54;
        .byte 54;
        .byte 54;
        .byte 54;
        .byte 54;
15      .byte 54;
        .byte 54;
        .byte 54;
        .byte 54;
        .byte 54;
20      ;
        Brake_values:
        .byte 45;
        .byte 45;
        .byte 40;
25      .byte 20;
        .byte 20;
        .byte 10;
        .byte 10;
        .byte 2;
30      .byte 2;
        .byte 2;
        .byte 2;
        .byte 2;
        .byte 2;
```

```
        .byte 2;
        .byte 2;
        .byte 2;
        ;
 5   init_sys:
        di;                               disable interrupts
        ; !* must write 1 bit in P01.2 for emulator stack to work!
        ld    P01M,#%05;                  P0 is all inputs
        ld    P2M, #%0D0;                 P2(0,1,2,3,5) outputs, P2(4,6,7) are inputs
10      ld    P2,#%00;                    Set drive outputs off
        ld    P3M, #%03;                  P3=Analog Inputs, P2 is pull-ups active
        ld    SPL, #STACK;                init stack ptr
        ;
        ; IRQ5 IS HIGHEST PRIORITY!
15      ;
        ld    IPR,#%0e;                   A>B>C, 4>1, 5>3, 0>2
        ld    IMR,#0;                     *@!# MUST do this, undefined otherwise!
        ld    IRQ, #0;                    no ints pending
        ;
20      ; clear all internal RAM
        ;
        srp   #0;                         use register bank 0
        ld    r4,#6;                      start at address 6
        ld    r5,#%7a;                    for 7a locations  (%80 - 6)
25   clr_ram_loop:
        ld    @r4,#0;      clear @r4
        inc   r4;          next address
        djnz  r5,clr_ram_loop;
        ;
30      ; Load PWM current table
        ld r4,#^HB PWMcur_values;         r4 and r5 set the 2-byte address
        ld r5,#^LB PWMcur_values;         of the ROM current table
        ld r6,#PWMcur_regs;               r6 has the target RAM address
        ld r7,#32;                        and r7 the total # of values
```

```
        ;
        copy_cur_loop:
           ldci @r6,@rr4;              This copies the table into
        RAM/registers
 5      djnz
        r7,copy_cur_loop;
        ;
        ; Load PWM braking table
           ld  r4,#^HB Brake_values;   r4 and r5 are the 2-byte address of
10      the
           ld  r5,#^LB Brake_values;   beginning of the braking value tables
           ld  r6,#PWMbrake_regs;
           ld  r7,#16;
        ;
15      copy_brake_loop:
           ldci @r6,@rr4;              This copies the table into
        RAM/registers
           djnz r7,copy_brake_loop;
        ;
20      ; initialize variables
        ;
        srp #drive1_regs;              select only register bank
        ldrQuad_position,#%80;         load positioning registers with proper
        values
25      ld rPWM_count_cycle,#%20;
        ld rPWM_count_cur,#%40;
        ld Flags,#%00;
        ;
        ; Wait for home then, initialize quadrature pattern - R1 - Quad_pos_ptrn
30      ld rQuad_pos_ptrn,#QuadPos;    initialize the pattern
        ;
        wait_for_home: ;               this assures quad cams are home before
           and Flags,#%FD;             starting the drive
           tm P0,#%01;
```

27

```
        jr z,wait_for_home
        ;
        set_quad_pos_ptrn:
        rl rQuad_pos_ptrn;
5       rl rQuad_pos_ptrn;
        ld rQuad_pos_tstreg,Quad_pos_ptrn;
        and rQuad_pos_tstreg,#%06;
        ld rQuad_pos_ptrnu,P0;
        and rQuad_pos_ptrnu,#%06;
10      cp rQuad_pos_ptrnu,rQuad_pos_tstreg;
        jr nz,set_quad_pos_ptrn;
        ; Start hfmsec timer
        ;
        ;
15      ; 12 MHZ oscillator. 6 MHZ after /2, 1.5 MHZ after /4.
        ; PRE0 = P5 P4 P3 P2 P1 P0 X M  where P0-P5 is prescale, X is DC, M is
        ; modulo N
        ;
        init_timer0:
20      ld    PRE0,#%3d;            /15, modulo n   (1500khz -> 100 KHZ)
        ld    T0,#18;               /18       (100khz -> 5.55 khz)
        or    TMR,#%3;              load t0, enable t0
        or    IMR,#%10;             ENABLE TIMER 0
        ei
25      jr
        main_loop;                  done with inits, go into main_loop
        ;
        ;
        ;*********************************************************************
30      ***
        ; main_loop
        ;*********************************************************************
        ***
        ;
```

```
       main_loop:
         .byte wdt;
         jr    main_loop;           everything happens at interrupt level!
       ; jp hfmsec_service;
 5     ;
       ;
       ;*********************************************************************
       ***
       ;
10     ;    hfmsec_service
       ;
       ;*********************************************************************
       ***
       ;
15     hfmsec_service:
       ;
         or rP2_image,#%20;
         ld P2,rP2_image;
       ;
20     ; Check "flag" and debounce registers
       check_cur_sensor:
         tm P2,#%10;                This checks the motor current sensor
         jr z,reset_cur_flag;       and sets or resets the flag accordingly
         or Flags,#%01;
25       jr check_pos_error;
       reset_cur_flag;
         and Flags,#%0FE;
       ;
       check_pos_error:
30       tm Flags,#%02;             These first four routines check the
         jp nz,position_error_loop; flags set for hi and over temperature
         cp Quad_position,#%0B2;    and for the beeper and position error
         jp pl,position_error_loop;
         cp Quad_position,#%04E;
```

```
            jp mi,position_error_loop;
        temp_hi_count_check:
            cp Temphi_count,#%01;          check here to see if high temperature
            jr mi,temp_over_count_check;   debounce counter/register is over
5           dec Temphi_count;
        temp_over_count_check:
            cp Tempovr_count,#%01;         check here to see if over temperature
            jr mi,check_beeper_on;         debounce register is over the set value
            dec Tempovr_count;
10      ;
        check_beeper_on:
            tm rFlags,#%08;                check here to see if the beeper has been
            jr nz,beeper_control;          set on by any of the "loop" routines
            jr PWM_loop;
15      ;
        beeper_control: ;                  This routine turns the drive to the
            dec rBeepon_dur;               beeper on and off according to the
            jr mi,beep_off;                count values in the on and space
        beep_off: ;                        registers
20          and rP2_image,#%0DF;
            ld P2,rP2_image;               Here the beeper is turned off and the
            dec rBeepspc_dur;              off count decremented during the
            jr mi,reset_beeper;            off period
            jr PWM_loop;
25      reset_beeper:
            or rP2_image,#%20;             This turns the beeper back on
            ld P2,rP2_image;
        ;
        PWM_loop:
30          tm P0,#%01;
            jr nz,read_quad_cam;
            cp @PWM_count_cur,#PWMcur_resolution;
            jr z,read_quad_cam;
            dec rPWM_count_cycle;          check current PWM cycle and
```

```
            jr mi,loop_reset;              turn drive off if time is up
            dec rPWM_on_counter;
            jr mi,set_current_off;
            jp read_quad_cam;
 5      ;
        loop_reset:
        ;   cp  @PWM_count_cur,#%36;
        ;   jr  z,Full_loop_reset;
            and rP2_image,#%0DF;
10          ld  P2, rP2_image;
            or  rP2_image,#%01;             disables MICREL driver
            ld  P2, rP2_image;
            and rP2_image,#%0FD;            Resets shorting FET in drive
        and
15          ld  P2,rP2_image;               resets the brake shorting
        delay
            ld  Brake_count,#%00;           sets MICREL for drive FET
            and rP2_image,#%0FE;            Resets the PWM loop times
            ld  rPWM_count_cycle,#PWMcur_resolution;   for new PWM cycle
20          cp  @rPWM_count_cur,#%00;
            jr  z,set_current_off;
            ld  P2,rP2_image;
            ld  rPWM_on_counter,@PWM_count_cur;
            cp  PWM_count_cur,#%50;
25          jr  pl,read_quad_cam;
            sub PWM_count_cur,#%10;
            ld  Brake_counter,@PWM_count_cur;
            add PWM_count_cur,#%10;
            jp  read_quad_cam;
30      ;Full_loop_reset;
        ;   ld  Brake_count,#%00;
        ;   ld  rPWM_count_cycle,#PWMcur_resolution;
        ;   ld  rPWM_on_counter,@PWM_count_cur;
        ;   jp  read_quad_cam;
```

```
       ;
       set_current_off:
       ;  tm  rBrake_count,#%02;
       ;  jr  z,set_brake_on;
 5        inc rBrake_count;                    If quad cam is in "home"
          ld  rPWM_on_counter,#%00;            position - this assures the
          cp  rBrake_count,#%02;
          jr  pl,set_brake_on;
          or  rP2_image,#%01;                  drive current is OFF!
10        ld  P2,rP2_image;
       disable MICREL driver
          cp  Brake_count,#%02;
          jr  mi,read_quad_cam;
       set_brake_on:
15        cp  PWM_count_cur,#%50;              If braking delay is over, and
          jr  pl,read_quad_cam;                PWM is less than step 16, then
          dec Brake_counter;
          jr  mi,set_brake_off;
       ;  or  rP2_image,#%01;
20     ;  ld  P2,rP2_image;
          or  rP2_image,#%02;                  turn on the braking?shorting FET
          ld  P2,rP2_image;
          and rP2_image,#%0FE;
          ld  P2,rP2_image;
25        jr  read_quad_cam;
       set_brake_off:
          ld  Brake_counter,#%00;
          or  rP2_image,#%01;
          ld  P2,rP2_image;
30     ;  or  rP2_image,#%02;
       ;  ld  P2,rP2_image;
       ;
       read_quad_cam:
          ld  rQuad_pos_ptrnu,P0;              Load quadrature pattern
```

```
         and rQuad_pos_ptrnu,#%07;              into register and check
         ld  rQuad_pos_tstreg,rQuad_pos_ptrnu;  for home
         and rQuad_pos_tstreg,#%01;
         jp  z,pattern_check_inc;
   5     ld  rPWMcur_limit,#%00;
         ld  rPWM_count_cur,#%40;
         ld  rQuad_position,#%80;
         or  P2_image,#%01;                     disable MICREL driver
         ld  P2,P2_image;
  10     dec PWM_count_cycle;
         cp  PWM_count_cycle,#%01;
         jr  mi,save_the_relay;
         and rP2_image,#%0F1;
         add PWM_count_cycle,#%01;
  15     save_the_relay:
         ld  P2,rP2_image;
         ld  rQuad_pos_tstreg,rQuad_pos_ptrn;   if home, load 128 (80H)
         and rQuad_pos_ptrnu,#%06;              into position register
         and rQuad_pos_tstreg,#%06;             go on to set new
  20     cp  rQuad_pos_tstreg,rQuad_pos_ptrnu;  pattern into register
         jr  nz,new_pattern_lo;
         jp  return;
         ;
         new_pattern_lo:                        ;shift pattern "back" and
  25     rr  rQuad_pos_ptrn;                    check -- if not "back" then
         rr  rQuad_pos_ptrn;                    go on to check "forward"
         ld  rQuad_pos_tstreg,rQuad_pos_ptrn;
         and rQuad_pos_tstreg,#%06;
         cp  rQuad_pos_tstreg,rQuad_pos_ptrnu;
  30     jr  nz,new_pattern_hi;
         jp  return;
         ;
         new_pattern_hi:                        ;if pattern not "back" then
         rl  rQuad_pos_ptrn;                    it must be "forward"
```

33

```
          rl rQuad_pos_ptrn;                          reset and check for
          rl rQuad_pos_ptrn;                          "forward"
          rl rQuad_pos_ptrn;
          ld rQuad_pos_tstreg,rQuad_pos_ptrn;
 5        and rQuad_pos_tstreg,#%06;
          cp rQuad_pos_tstreg,rQuad_pos_ptrnu;
          jp nz,reset_quad_pos_ptrn;
          jp return;
          ;                        If not "forward", then we've missed a pattern increment
10        ;
          ;                        OOPS!   go to error routine
          ;
          position_error_loop: ;                      if above routines did not
             or Flags,#%02;                           find the new quad cam
15           tm P0,#%01;                              position -- then more than
             jp nz,position_error_loop_reset;         one step must have been
             dec rPWM_count_cycle;                    lost -- this set of routines
             jr mi,error_loop_reset;                  holds the PWM drive current
             tm @rPWM_count_cur,#%0FF;                constant until "home" is
20           jr z,set_error_cur_zero;                 sensed -- even if step loss
             dec rPWM_on_counter;                     is in the "home" range
             jr z,set_error_cur_zero;
             jp return;
          ;
25        error_loop_reset:
             or  rP2_image,#%01;
             ld rPWM_count_cycle,#PWMcur_resolution;  here the PWM loop is reset
             tm rPWMcur_limit,#%0FF;                  for function in the "error"
             jr z,set_error_cur_zero;                 condition
30           ld P2,rP2_image;
             ld rPWM_on_counter,@PWM_count_cur;
             jp return;
          ;
          set_error_cur_zero:
```

34

```
            or rP2_image,#%01;              this sets the current in the error
            ld P2,rP2_image;                condition to zero
            jp return;
        ;
 5      position_error_loop_reset:          ;this sets the error flag to zero
            and Flags,#%0FD;                indicating the error condition is
            jp return;                      corrected
        ;
        pattern_check_inc:
10          ld rQuad_pos_tstreg,rQuad_pos_ptrn;    here we check to see if the out of
            and rQuad_pos_tstreg,#%06;             home position has been
        incremented
            cp rQuad_pos_ptrnu,rQuad_pos_tstreg;
            jp z,check_motor_temp;                 this routine checks if the quad cam
15          rl rQuad_pos_ptrn;                     has moved so its pattern has
        "rotated"
            rl rQuad_pos_ptrn;                     right
            ld rQuad_pos_tstreg,Quad_pos_ptrn;
            and rQuad_pos_tstreg,#%06;
20          cp rQuad_pos_tstreg,rQuad_pos_ptrnu;
            jr nz,pattern_check_dec;
            inc rQuad_position;
            jr set_current;
        ;
25      pattern_check_dec:                   ;this routine will decrement the
            rr rQuad_pos_ptrn;               position register if it has not been
            rr rQuad_pos_ptrn;               found to have been incremented
            rr rQuad_pos_ptrn;               if it is not found to be decremented
            rr rQuad_pos_ptrn;               then there is an error in the position
30          ld rQuad_pos_tstreg,rQuad_pos_ptrn;
            and rQuad_pos_tstreg,#%06;
            cp rQuad_pos_tstreg,rQuad_pos_ptrnu;
            jp nz,reset_quad_pos_ptrn;
            dec rQuad_position;
```

```
            jr set_current;
       ;
       set_current:
            ld  rQuad_pos_tstreg,rQuad_position;    First if there is current in the
 5          cp  rQuad_position,#%80;                shorted motor, AND if we entered
            jr  z,check_motor_temp;                 "home" from the other side!
            jr  mi,set_rev_current;
            ld  Tstreg,Flags;
            and Tstreg,#%41;
10          cp  Tstreg,#%41;
            jr  z,check_motor_temp;
            or  Flags,#%80;
            and Flags,#%0BF;                        this routine sets the count for the
            or  rP2_image,#%04;                     PWM loop - setting the current table
15          ld  P2,P2_image;                        pointer with the help of the reverse
            ld  rQuad_pos_tstreg,Quad_position;     and decrease routines
            sub rQuad_pos_tstreg,#%80;
            rl  rQuad_pos_tstreg;
            cp  rPWMcur_limit,rQuad_pos_tstreg;
20          jr  pl,decrease_cur;
            ld  rPWMcur_limit,rQuad_pos_tstreg;
            cp  rPWM_count_cur,#%5F;
            jr  pl,check_motor_temp;
            inc rPWM_count_cur;
25          inc rPWM_count_cur;
            jr  check_motor_temp;
       decrease_cur:
            ld  rPWMcur_limit,rQuad_pos_tstreg;     this routine decreases the current
            cp  rPWM_count_cur,#%40;                to the drive - decrementing the
30          jr  mi,check_motor_temp;                current table pointer
            dec rPWM_count_cur;
            dec rPWM_count_cur;
            jr  check_motor_temp;
       ;
```

```
    set_rev_current:
        ld Tstreg,Flags;
        and Tstreg,#%81;
        cp Tstreg,#%81;
 5      jr z,check_motor_temp;
        or Flags,#%40;
        and Flags,#%7F;
        ld rPWMcur_limit,#%80;
        sub rPWMcur_limit,rQuad_position;   This routine finds the reverse value
10      ; rl rPWMcur_limit;                 the distance from 128 (%80) and sets
        add rPWMcur_limit,#%40;             the current pointer appropriately
        or rP2_image,#%08;
        ld P2,P2_image;
        cp rPWMcur_limit,rPWM_count_cur;
15      ; jr mi,decrease_cur;
        jr mi,decrease_rev_cur;
        cp rPWM_count_cur,#%5F;             if at end of table (40H+32) then
        jr pl,check_motor_temp;             don't increment pointer
        inc rPWM_count_cur;
20      ; inc rPWM_count_cur;
        jr
        check_motor_temp;
    decrease_rev_cur;
        ld rPWMcur_limit,rQuad_pos_tstreg;
25      cp rPWM_count_cur,#%40;
        jr mi,check_motor_temp;
        dec rPWM_count_cur;
        ; dec rPWM_count_cur;
        jr check_motor_temp;
30      ;
        ;
    check_motor_temp:
        ; ld Beeper_on,#%00;                here the comparitors are used to
        ; tm P3,#%04;                       check if the drive motor is hot
```

37

```
    ; jr nz,over_temp;                              or over temperature
    ; dec Tempovr_count;
    ; tm P2,#%80;
    ; jr z,over_temp_lockout;
5   ; tm P3,#%02;
    ; jr nz,high_temp;
    ; dec Temphi_count;
    ; tm P2,#%40;
    ; jr nz,set_cur_temphi_lim;
10  ; jp return;
    ;
    ;over_temp:
    ; cp rTempovr_count,#%0F0; here the debounce register is handled
    ; jr pl,over_temp_lockout; for the over temperature condition
15  ; add rTempovr_count,#%0F;
    ; jp return;
    ;
    ;over_temp_lockout:
    ; or  rP2_image,#%01;        if debounce indicates the motor is
20  ; ld  P2,rP2_image;          in the over tempeature condition, the
    ; ld  Beeper_on,#%0f;        system is shut down - and the other
    ; ld  Beepon_dur,#%80;       motor is alerted
    ; ld  Beepspc_dur,#%80;
    ; jp return;
25  ;high_temp:
    ; cp  rTemphi_count,#%0F0;
    ; jr  pl,set_cur_temphi_lim;
    ; add rTemphi_count,#%0F;
    ; jp return;
30  ;
    ;set_cur_temphi_lim:
    ; cp  PWM_on_counter,#%19;    in the high temperature condition, the
    ; jr  mi,onward_ho;           drive current is limited to reduce
    ; ld  PWM_on_counter,#%19;    the rapid motor heating
```

38

```
;   or  Flags,#%08;
;   ld  Beepon_dur,#%0FF;
;   ld  Beepspc_dur,#%0FF;
;
;onward_ho:
;   jp retrun;
;
reset_quad_pos_ptrn:                              ;if a position error is detected, the
    rl rQuad_pos_ptrn;                             pattern is reset in this loop - then
    rl rQuad_pos_ptrn;                             the system must return home before
    ld rQuad_pos_tstreg,Quad_pos_ptrn;  the error is "reset"
    and rQuad_pos_tstreg,#%06;
    ld rQuad_pos_ptrnu,P0;
    and rQuad_pos_ptrnu,#%06;
    cp rQuad_pos_ptrnu,rQuad_pos_tstreg;
    jr nz,reset_quad_pos_ptrn;
    jp position_error_loop;
;
return:
;   and rP2_image,#%0DF;
;   ld P2,rP2_image;
;   jp main_loop;
    iret;
```

I claim:

I claim:

1. In an electric lawn mower for cutting lawns comprising:

a frame supporting an operator station, a mower deck with at least one cutter blade rotated by an electric motor, and at least two opposed wheels driven by associated reversible electric wheel-drive motors, a source of electrical power for said wheel-drive motors and said at least one blade motor mounted on said frame, operating controls for mower-operator actuation associated with said operator station for directing electrical power selectively to each of said wheel-drive motors, and for directing said power to said at least one blade motor, an electrical system interconnecting said source of power, said operator controls and said wheel-drive motors and interconnecting said controls and said at least one blade motor;

the improvement comprising:
an intelligent control unit electrically interposed between each of said wheel-drive motors and said operator controls and a sensing unit associated with each of said motors for providing informational input to each of said control units from said wheel-drive motors, said control unit providing means to control current applied to each of said motors responsive to said mower-operator actuation of said operating controls.

2. The mower of claim 1 wherein said mower is disposed for riding by an operator and said operator station comprises a seat and foot rest for the operator.

3. The mower of claim 2 wherein said operating controls comprises a quadrature encoder for each said wheel drive motor.

4. The mower of claim 3 wherein said sensing units are current sensors.

5. The mower of claim 3 wherein said source of power is a storage battery.

6. The mower of claim 3 wherein said intelligent control units each comprise a programmed microcontroller for generating pulse width modulation signals for speed control and for dynamic braking for deceleration and stopping of said wheel drive motors wherein said microcontrollers are loaded with tables of allowable values whereby extreme control settings will result in no harm to said wheel drive motors and abrupt accelerations and decelerations harmful to said lawn and/or potentially harmful to the operator are avoided.

7. The mower of claim 6 wherein said table of allowable values are arrayed in a nonlinear spaced ascending sequence from a home position.

8. The mower of claim 6 further comprising a temperature sensor associated with each said blade and wheel drive motors and said microcontrollers are programmed to shut down the drive if the temperature of any such sensor exceeds a preset level.

9. The mower of claim 6 wherein said microcontrollers are in electrical connection with circuitry for monitoring and controlling charge in said storage battery.

10. The mower of claim 6 wherein said microcontrollers are programmed to monitor battery voltage and, when the voltage drops below the 80% discharge point for said battery, to disable said blade motors for said mower deck, whereby the remaining power is preserved to permit the mower to be driven back to its point of storage for recharge.

11. In an electric lawn mower for cutting lawns comprising:

a frame supporting an operator station, a mower deck with at least one cutter blade rotated by an electric motor, at least two opposed wheels driven by associated reversible electric wheel-drive motors, and at least one stabilizing, undriven-swivel-wheel;

a source of electrical power for said motors;

operating controls for mower-operator actuation associated with said operator station for directing electrical power selectively to each of said wheel-drive motors;

wherein said frame is hinged to a leading frame having at least one leading caster and having a mowing deck with leading and trailing edges, said leading edge hingedly suspended from said leading frame and said trailing edge supported by at least one wheel; and an electrical system interconnecting said source of power, said at least one mower deck motor, said operator controls and said wheel-drive motors, The improvement comprising:
an intelligent control unit electrically interposed between each of said wheel-drive motors and said operator controls and an information sensing unit associated with each of said wheel-drive motors for providing informational input to said control units from said wheel-drive motors.

12. The mower of claim 11 wherein said intelligent control unit interposed electrically between said operating controls and said motors receives informational input from said operating controls on both existing status and any actuation thereof indicating operator's control directives and further receives information on any one or more of speed, direction of turning, back EMF, drive current and temperature of and load on said motors and is programmed to avoid conditions harmful to said intelligent control, said motors and any mower components whereby conditions harmful to safe and effective operation of said mower or harmful to its operator or damaging to the lawn being cut are avoided.

13. An intelligent control system for controlling the speed of an electrically powered lawn maintenance vehicle, the vehicle having a known weight and comprising:

a source of electrical power;

a drive subsystem comprising at least one motor drive unit and at least one electric wheel-motor for propulsion, a motor speed and direction current sensor, and at least one temperature sensor;

a power distribution subsystem; and an operator control unit;

the control system comprising:
a microcontroller, programmed to sense motor speed and direction, operator commands from the operator control unit, and temperature of the drive subsystem components, and to generate pulse width modulated speed control signals;

the microcontroller being programmed with tables of speed control values for generating corresponding pulse width speed control signals, and the motor drive unit being capable of supplying current to the at least one motor in accordance with the speed control signals, and the operator control unit, having a control handle operatively connected to a handle position sensor, the position sensor having a home position to indicate a desired STOP condition and at least two forward and two reverse speed positions, being capable of generating operator commands, the table of speed control values being selected in accordance with the dynamic operating characteristic of the electric motor and the weight of the vehicle, whereby safe and effective operation of said vehicle is achieved, conditions harmful to the drive subsystem are avoided and forces harmful to the lawn and to the operator are avoided by means for avoidance of sharp reversal of said wheel-motors and drive wheels when a wheel-motor sensor indicates presence of short circuit or drive current sufficient to cause harm, and operation over a safe temperature is avoided by means responsive to said temperature sensor.

* * * * *